United States Patent
Kecht et al.

(10) Patent No.: US 10,988,629 B2
(45) Date of Patent: Apr. 27, 2021

(54) CORE-SHELL PARTICLE-BASED SECURITY PIGMENT AND METHOD FOR PRODUCTION THEREOF

(71) Applicant: GIESECKE+DEVRIENT CURRENCY TECHNOLOGY GMBH, Munich (DE)

(72) Inventors: Johann Kecht, Munich (DE); Axel Schlossbauer, Munich (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 209 days.

(21) Appl. No.: 15/773,204

(22) PCT Filed: Nov. 9, 2016

(86) PCT No.: PCT/EP2016/001865
§ 371 (c)(1),
(2) Date: May 3, 2018

(87) PCT Pub. No.: WO2017/080656
PCT Pub. Date: May 18, 2017

(65) Prior Publication Data
US 2018/0320014 A1  Nov. 8, 2018

(30) Foreign Application Priority Data
Nov. 11, 2015  (DE) ..................... 10 2015 014 525.8

(51) Int. Cl.
| | | |
|---|---|---|
| *B01J 13/16* | (2006.01) | |
| *B42D 25/355* | (2014.01) | |
| *C09B 67/08* | (2006.01) | |
| *C09D 11/50* | (2014.01) | |
| *C09D 11/037* | (2014.01) | |
| *C09K 11/06* | (2006.01) | |
| *B42D 25/29* | (2014.01) | |
| *B42D 25/387* | (2014.01) | |
| *G07D 7/00* | (2016.01) | |
| *G07D 7/1205* | (2016.01) | |
| *C09K 9/02* | (2006.01) | |
| *C09K 11/02* | (2006.01) | |
| *B42D 25/382* | (2014.01) | |
| *D21H 21/30* | (2006.01) | |
| *B42D 25/30* | (2014.01) | |
| *C09B 67/02* | (2006.01) | |

(Continued)

(52) U.S. Cl.
CPC .............. *C09D 11/50* (2013.01); *B01J 13/16* (2013.01); *B42D 25/29* (2014.10); *B42D 25/30* (2014.10); *B42D 25/355* (2014.10); *B42D 25/373* (2014.10); *B42D 25/378* (2014.10); *B42D 25/382* (2014.10); *B42D 25/387* (2014.10); *C08L 61/06* (2013.01); *C08L 61/12* (2013.01); *C08L 61/28* (2013.01); *C08L 61/30* (2013.01); *C08L 61/34* (2013.01); *C09B 67/0013* (2013.01); *C09B 67/0033* (2013.01); *C09B 67/0097* (2013.01); *C09D 11/037* (2013.01); *C09D 11/54* (2013.01); *C09K 9/02* (2013.01); *C09K 11/025* (2013.01); *C09K 11/06* (2013.01); *D21H 21/30* (2013.01); *D21H 21/40* (2013.01); *G07D 7/003* (2017.05); *G07D 7/1205* (2017.05); *C08G 8/24* (2013.01); *C08G 12/34* (2013.01); *C08G 14/10* (2013.01); *C09K 2211/1007* (2013.01); *C09K 2211/1018* (2013.01); *C09K 2211/1475* (2013.01); *C09K 2211/1491* (2013.01); *G07D 2207/00* (2013.01)

(58) Field of Classification Search
CPC .......... B01J 13/16; B42D 25/29; B42D 25/30; B42D 25/355; B42D 25/373; B42D 25/378; B42D 25/382; B42D 25/387; C08L 61/06; C08L 61/12; C08L 61/28; C08L 61/30; C08L 61/34; C09B 67/0013; C09B 67/0033; C09B 67/0097; C09D 11/037; C09D 11/50; C09D 11/54; C09K 11/025; C09K 11/06; C09K 9/02; C09K 2211/1007; C09K 2211/1018; C09K 2211/1475; C09K 2211/1491; D21H 21/30; D21H 21/40; G07D 7/003; G07D 7/1205; G07D 2207/00; C08G 12/34; C08G 14/10; C08G 8/24
See application file for complete search history.

(56) References Cited

U.S. PATENT DOCUMENTS

| | | | |
|---|---|---|---|
| 3,755,222 A | 8/1973 | Gruber et al. | |
| 4,306,040 A | 12/1981 | Baer | |

(Continued)

FOREIGN PATENT DOCUMENTS

| | | |
|---|---|---|
| CN | 1729222 A | 2/2006 |
| CN | 1852808 A | 10/2006 |

(Continued)

OTHER PUBLICATIONS

International Search Report from PCT Application No. PCT/EP2016/001865, dated Feb. 27, 2017.

(Continued)

*Primary Examiner* — Irina S Zemel
(74) *Attorney, Agent, or Firm* — Workman Nydegger

(57) ABSTRACT

The invention relates to a security pigment, comprising core-shell particles having a core based on an organic addition polymer, a shell based on an organic condensation polymer and a feature substance present in the core in finely dispersed or dissolved form, wherein the addition polymer is a three-dimensionally cross-linked duromer.

20 Claims, No Drawings

(51) Int. Cl.
*C09D 11/54* (2014.01)
*C09B 67/22* (2006.01)
*C08L 61/28* (2006.01)
*C08L 61/30* (2006.01)
*C08L 61/34* (2006.01)
*C08L 61/12* (2006.01)
*C08L 61/06* (2006.01)
*D21H 21/40* (2006.01)
*B42D 25/373* (2014.01)
*B42D 25/378* (2014.01)
*C08G 12/34* (2006.01)
*C08G 14/10* (2006.01)
*C08G 8/24* (2006.01)

(56) References Cited

U.S. PATENT DOCUMENTS

| | | | |
|---|---|---|---|
| 4,833,311 A | 5/1989 | Jalon | |
| 4,891,505 A | 1/1990 | Jalon | |
| 5,082,757 A * | 1/1992 | Keoshkerian | G03G 9/09328 428/402.24 |
| 5,304,448 A * | 4/1994 | Keoshkerian | G03G 9/09328 430/110.2 |
| 5,577,100 A * | 11/1996 | McGregor | H04M 15/00 455/406 |
| 5,795,379 A | 8/1998 | Schwenk et al. | |
| 6,417,269 B1 | 7/2002 | Murray et al. | |
| 9,327,542 B2 | 5/2016 | Kecht et al. | |
| 2005/0256252 A1 | 11/2005 | Williams | |
| 2007/0190297 A1 | 8/2007 | Heim et al. | |
| 2008/0163994 A1 | 7/2008 | Hoppe et al. | |
| 2009/0054616 A1 | 2/2009 | Puchinger et al. | |
| 2013/0307258 A1 | 11/2013 | Eberius et al. | |
| 2014/0275395 A1 | 9/2014 | Xu et al. | |
| 2015/0328915 A1 | 11/2015 | Kecht et al. | |

FOREIGN PATENT DOCUMENTS

| | | |
|---|---|---|
| CN | 104411505 A | 3/2015 |
| DE | 102004063217 A1 | 7/2006 |
| DE | 102006008245 A1 | 8/2007 |
| DE | 102012013244 A1 | 1/2014 |
| EP | 0256922 A1 | 2/1988 |
| EP | 2463344 A1 | 6/2012 |
| KR | 20120077329 A | 7/2012 |
| WO | 2004104060 A2 | 12/2004 |
| WO | 2007096200 A1 | 8/2007 |
| WO | 2008141972 A1 | 11/2008 |

OTHER PUBLICATIONS

International Search Report from corresponding PCT Application No. PCT/EP2016/001865, dated Feb. 27, 2017.
Office Action from corresponding CN Application No. 201680065822.5, dated Apr. 26, 2019.
Office Action from corresponding CN Application No. 201680065822.5, dated Dec. 30, 2019.
Office Action from corresponding CN Application No. 201680065822.5, dated Jun. 15, 2020.
Office Action from corresponding IN Application No. 201837016112, dated May 29, 2020.

* cited by examiner

CORE-SHELL PARTICLE-BASED SECURITY PIGMENT AND METHOD FOR PRODUCTION THEREOF

BACKGROUND

The invention relates to a security pigment based on core-shell particles, comprising a core based on a porous addition polymer, a shell based on a condensation polymer and a feature substance being present in the core in finely dispersed or dissolved form. The invention furthermore relates to a manufacturing method for the core-shell particle containing the feature substance.

The invention in particular relates to comparatively simple to manufacture core-shell particles which contain an optical feature substance dissolved or finely dispersed in the core, e.g. an organic or inorganic luminescence or absorber dye. By coating the core from addition polymer, specifically a polyurethane core or a polyurea core, with an encasing layer of a condensation polymer, the pigment is protected against migration and bleeding. The advantage of the particles according to the invention consists, among other things, in the fact that the condensation polymer of the outer shell is formed by an acidic condensation reaction and therefore a tight, not very porous shell is formed. This outer shell protects the inner, porous yet simple to manufacture polyurethane core optimally from attacks with solvents, weak acids and bases or redox-active substances.

The print U.S. Pat. No. 5,795,379 A describes the incorporation of luminescing dyes in solid resin. The print contains exclusively the employment of cross-linked polyurea substances and polyurethanes as a duromer matrix as well as methods for manufacturing the same. An additional encasing of ground resinous particles is not mentioned.

The print U.S. Pat. No. 4,306,040 describes a core-shell particle with a slightly cross-linked elastomer polymer as a core material and a thermoplastic polymer as a shell. The objective is an improved compatibility of the core with polyamides which receive a higher impact resistance by incorporating the elastomers. The fraction of the shell on the total material amounts to 10 to 50 percent by weight.

The technical solution according to the invention with two strongly cross-linked duromers offers a distinctly better protection from chemical attacks on the feature substance distributed in the core, because here less diffusion paths occur and no swelling-up is possible.

The print U.S. Pat. No. 6,417,269 B1 describes a diol latex which is introduced into a condensation reaction medium to attain a combination of the diol polymer with the condensation polymer. However, no polyurethane/polyurea is used in the core and the synthesis process is comparatively elaborate (protective gas, handling reactive monomers) and usually requires toxic, metalliferous catalysts for propagating the condensation reaction.

The print WO 2004/104060 A2 describes a burnable core-shell particle as a color pigment for thermally activated direct writing methods, wherein the particle has a nitro resin as a core material and an ethylene-based polymer as a shell. The ratio between shell and core material can reach from 20:1 to 0.2:1. However, the shell not necessarily covers the entire surface of the core and could therefore not guarantee also the protection of an embedded feature substance.

The print US 2014/0275395 A1 describes a core-shell particle with a core of polyurethane and a shell from polyacrylate. Such particles are suitable, among other things, as additives for ink-jet applications, because they can improve certain ink properties (e.g. the capability of jetting, smear fastness). The employed polyacrylate shell (i.e. a thermoplastic latex) protects a porous core from a polyurethane (which is obtainable by a simple-to-carry-out extrusion process) insufficiently against solvents which can make the acrylate polymer swell up. A color pigment so constituted is insufficiently protected against solvent attacks.

The print DE 10 2006 008 245 A1 describes an organic luminescent substance which is equipped with a shell which protects the luminescent substance from chemical influences and which increases light resistance. In contrast to the present invention, the organic luminescent substance is coated directly with an organic or inorganic shell. This procedure has several technical disadvantages. On the one hand, it is not possible to supply a uniform coating method for different illuminants, i.e. the coating method per se is technically distinctly more elaborate. On the other hand, there sinks e.g. the relative luminous efficiency of organic luminescence dyes if these are used directly as a core material.

The present invention is based on the object to supply an improved security pigment compared with the prior art. Furthermore, the present invention is based on the object to supply an improved method compared with the prior art for manufacturing a security pigment.

These objects are achieved by the feature combinations defined in the independent claims. Developments of the invention are the subject matter of the subclaims.

SUMMARY OF THE INVENTION 1. (First aspect) A security pigment, comprising core-shell particles having a core based on an organic addition polymer, a shell based on an organic condensation polymer and a feature substance present in the core in finely dispersed or dissolved form, wherein the addition polymer is a three-dimensionally cross-linked duromer.

2. (preferred) The security pigment according to item 1, wherein the addition polymer is formed from trimeric isocyanate monomers, preferably isocyanurate trimers of isophorone diisocyanate and amines or alcohols, preferably amines.

3. (preferred) The security pigment according to item 2, wherein the amines are selected from mono-, di- and tri-amines and preferably comprise triamines.

4. (preferred) The security pigment according to item 1 or 2, wherein the feature substance is a fluorescent or phosphorescent or photochromic or thermochromic feature substance or a UV- or IR- or VIS-absorbing dye.

5. (preferred) The security pigment according to any of items 1 to 4, wherein the feature substance is an organic or a metalorganic substance.

6. (preferred) The security pigment according to any of items 1 to 5, wherein the fluorescent or phosphorescent feature substance is excitable in the UV spectral region, in particular at a wavelength of 365 nm and emits in the visible spectral region.

7. (preferred) The security pigment according to any of items 1 to 6, wherein the fluorescent or phosphorescent feature substance emits in the IR spectral region, preferably between 700 nm and 2500 nm.

8. (preferred) The security pigment according to any of item 1 to 7, wherein the core two different luminescing dyes are present in finely dispersed or dissolved form, which form an energy transfer system in which the first luminescing dye after exciting transfers its excitation energy partially or completely to the second luminescing dye.

9. (preferred) The security pigment according to any of items 1 to 8, wherein the condensation polymer of the shell and the addition polymer of the core contain at least one identical monomer as a polymer constituent.

10. (preferred) The security pigment according to any of items 1 to 9, wherein the condensation polymer of the shell contains melamine as a monomer and preferably contains at the same time the addition polymer of the core melamine as a monomer.

11. (preferred) The security pigment according to any of items 1 to 10, wherein the condensation polymer of the shell is a formaldehyde-based condensation polymer, preferably a melamine-formaldehyde resin, melamine-phenol-formaldehyde resin or a phenol-formaldehyde resin or a melamine-guanidine-formaldehyde resin or a phenol-resorcin-formaldehyde resin, particularly preferably a melamine-formaldehyde resin.

12. (preferred) The security pigment according to any of items 1 to 11, wherein the security pigment is stable according to the test method A5, preferably A30, against toluene, ethyl acetate, hydrochloric acid (5%), sodium hydroxide solution (2%) and sodium hypochlorite solution (5% of active chlorine), wherein the feature intensity remaining after the test is higher than 80% of the start intensity.

13. (preferred) The security pigment according to any of items 1 to 12, wherein the security pigment is stable according to the test method A5 against acetone, wherein the feature intensity remaining after the test is higher than 80% of the start intensity.

14. (preferred) The security pigment according to any of items 1 to 13, wherein the mass fraction of the shell amounts to more than 10%, preferably more than 15%, in particular more than 20% in relation to the mass of the core.

15. (Second aspect) A method for manufacturing a security pigment based on core-shell particles, comprising a core based on an organic addition polymer, a shell based on an organic condensation polymer and a feature substance being present in the core in finely dispersed or dissolved form, having a) the step of supplying a particle based on an addition polymer with a feature substance dissolved therein or present finely dispersed therein; and b) the step of encasing the particle obtained in step a) with a shell based on a condensation polymer, wherein the addition polymer is a three-dimensionally cross-linked duromer.

16. (preferred) The method according to item 15, wherein the security pigment is defined according to any of claims 1 to 14.

17. (preferred) The method according to items 15 or 16, wherein the particles based on an addition polymer by a mixture of a trimeric isocyanate monomer, preferably the isocyanurate trimer of isophorone diisocyanate and different mono-, di- or triamines using a mixed tool, preferably an industrial kneader or a twin-screw extruder, are heated to 150° C. to 250° C., preferably up to 180° C., and are thereupon ground to a grain size (D99) of smaller than 25 μm, preferably smaller than 12 μm, particularly preferably smaller than 6 μm.

18. (preferred) The method according to any of items 15 to 17, wherein in the step b) the particles obtained in step a) in a concentration in a region of 1 g/l to 250 g/l, preferably 5 g/l to 50 g/l and a condensation prepolymer, a melamine formaldehyde prepolymer preferably in a 0.1-fold to 10-fold quantity, preferably 1-fold to 3-fold of the mass of the particles obtained in step a) are stirred and thereby encased in a protective case using a homogenizer at temperatures in a region of 10° C.–100° C., preferably from 60° C. to 80° C., at a pH value in a region from 1 to 6.5, preferably from 3.5 to 5.5.

19. (Third aspect) The employment of a security pigment according to any of items 1 to 14 in a pigment concentrate or a printing ink, in particular for offset printing, screen printing or steel intaglio printing.

20. (Fourth aspect) The employment of a security pigment according to any of items 1 to 14 in a polymer composition, preferably in a value-document substrate, a security foil, a mottling fiber or a security thread.

21. (Fifth aspect) The value document, mottling fiber, security thread or security foil having a security pigment according to any of items 1 to 14.

DETAILED DESCRIPTION OF THE INVENTION

The invention contains an advantageous development of the method of incorporating luminescing dyes in a solid resin known from the print U.S. Pat. No. 5,795,379 A. The method according to the invention contains a further refinement step to protect the printing ink (or the value document) containing the luminescent pigment or security pigment by increasing the solvent stability of the core-shell particles against the usually typical migration or the so-called "bleeding". In this step, a protective case from a cross-linked condensation polymer is applied around the cross-linked resin (containing e.g. one or several feature substances, e.g. luminescence dyes, and ground to the desired grain size).

Whereas isocyanate-based addition polymers such as e.g. polyurethanes or polyurea always have a certain porosity (see U.S. Pat. No. 3,755,222) in a reaction extrusion without special dry reaction conditions (protective gas, vacuum, chemical additions, etc.), the condensation of melamine-formaldehyde resin ("MF resins") or other polycondensation polymers proceeds without gas-induced pore forming, because none of the monomers releases carbon dioxide through contact with water.

The subject matter of the present invention is, among other things, to combine the advantages of the simple and well scaleable production of polyaddition-resin-based, in particular isocyanate-based security pigments with the chemical-resistant properties of melamine-formaldehyde resins, by condensation-applying a protective case from melamine formaldehyde on a feature substance-loaded polyaddition-resin core.

This process step makes it possible to protect soluble or unstable feature substances against external influences, like acid or base contact, contact with organic solvents, extreme climatic conditions or contact with reducing or oxidizing substances.

According to a preferred execution, in a first step the feature substance to be protected is incorporated according to the print U.S. Pat. No. 5,795,379 A into a duromer matrix from an isocyanate-based polyaddition resin. For this purpose, the feature substances can be extruded or kneaded jointly with the raw materials of the employed resinous type (for example, polyurethane resin or polyurea resin). The preferred concentration of the feature substances in the mixture lies in a region of 0.1% to 25%, in particular preferably in a region of 3% to 20% (percent by weight). After termination of the extrusion or kneading process, the obtained resins containing the feature substances are ground to resinous powder, wherein the grain size is chosen according to the desired print application.

According to a preferred execution, a mixture of a trimeric isocyanate monomer, preferably isocyanurate trimer from isophorone diisocyanate, and different mono-, di- or triamines are employed for the generation of the core-polymer particles mixed with feature substance.

In a further preferred embodiment, a mixture of a trimeric isocyanate monomer, preferably isocyanurate trimer of isophorone diisocyanate, and different mono-, di- or trialcohols are employed.

Also mixtures from mono-, di- or triamines and mono-, di- or trialcohols are possible.

The mixture is heated in an industrial kneader to 150° C. to 250° C., preferably 180° C., and here kneaded up to hardening.

According to a further preferred embodiment, the mixture is extruded with a rising temperature profile into a double screw extruder at temperatures in a region from 5° C. to 250° C. Alternatively, arbitrary other three-dimensionally cross-linked isocyanate-based duromers, in particular other polyurethane resins or other polyurea resins, can be employed as a core material.

After termination of the extrusion process or kneading process, the obtained brittle resinous powders containing the feature substances are ground to the grain size corresponding to the desired application. For example, pigments for the use in offset printing applications possess preferably a grain size (d99)<12 μm. For the use in screen printing applications the pigments possess preferably a grain size (d99)<25 μm. For the use in steel intaglio printing applications the pigments possess preferably a grain size (d99)<6 μm. Here, it must be considered that the grain sizes can again increase through attaching the additional protective case. Preferably, the resinous particles are hence ground to a grain size (d99)<10 μm, in particular preferably (d99)<5 μm.

From this first cost-efficient and well-scaleable extrusion or churning step, one obtains a printable powder in the appropriate grain size. These pigments, however, still possess a porous or accessible surface which makes the contained organic luminescence dye vulnerable to external influences like acid or base contact, contact with organic solvents, extreme climatic conditions (such as warm, moist air) or contact with reducing or oxidizing substances. The porous surface is the necessary result from the reaction of water from the air with the isocyanate groups of the monomers under the conditions of the desired polyaddition reaction (heat) at which, among other things, gaseous carbon dioxide arises.

Subject matter of the invention is, among other things, the insertion of an additional coating step which remedies this disadvantage. In this second step, the polyurethane pigments or polyurea pigments obtained in the first step are encased with a protective polymer layer. Preferably, the protective polymer layer is a polycondensation polymer. Further preferably the polycondensation polymer of the shell contains at least one identical monomer like the polyaddition polymer of the core material to promote a direct growing up of the shell layer onto the core material. In particular preferably this monomer is melamine. The high functionality (three cross-linking groups per molecule) from melamine promotes a good growing and tight terminating of the shell layer.

According to a preferred embodiment, the particles to be coated are stirred in a concentration in a region from 1 g/l to 250 g/l, preferably 5 g/l to 50 g/l and a condensation prepolymer, preferably a melamine-formaldehyde prepolymer in a quantity 0.1-fold to 10-fold, preferably 1-fold to 3-fold of the mass of the particles to be coated, using a homogenizer at temperatures in a region from 10° C.–100° C., preferably from 60° C. to 80° C. at a pH value in a region from 1 to 6.5, preferably from 3.5 to 5.5 and therefore encased with a protective case. This reaction typically lasts 1-4 hours. If one chooses the pH value too low, one promotes the forming of condensation germs in the reaction solution, which subsequently promote the forming of condensation polymer particles beside the security pigments to be coated. If one chooses the pH value too high, the condensation reaction is slowed down unnecessarily, because the reactivity of the melamine decreases strongly compared with formaldehyde in the basic medium (D. Braun, W. Krausse, Angew. Makromol. Chem. 118 (1983) 165).

For the procedure of the coating it is irrelevant which feature substance was incorporated in the polyaddition polymer of the core material, because the determining surface properties (e.g. charge, chemical binding sites etc.) are determined substantially by the addition polymer of the duromer matrix. Therefore, a universal method for encapsulating feature substances is described herein.

According to further preferred embodiments, other condensation polymers, in particular condensation polymers on formaldehyde basis, can also be employed for coating, such as melamine-phenol-formaldehyde resins, phenol-formaldehyde resins as well as related resinous types like melamine-guanidine-formaldehyde resins or phenol resorcin-formaldehyde resins.

According to a further preferred embodiment, a condensation polymer is employed for coating which is formaldehyde-free and instead comprises another aldehyde, e.g. furfural. Furthermore, condensation polymers can be employed on the basis of mixtures of formaldehyde and one or several further aldehydes.

The security pigment contains preferably an optical feature substance which is active in the infrared (IR), visible (VIS) and/or ultraviolet (UV) spectral region. The feature substance can act absorbing or luminescing. Here this is e.g., an organic or inorganic luminescence or absorber dye, photochromic or thermochromic substance.

In an alternative embodiment, the security pigment contains a non-optical feature substance, e.g. a magnetic substance, a resonance-spectroscopy feature substance such as electron-spin-resonance feature substance (ESR), nuclear-quadrupole-resonance feature substance (NQR) or nuclear-magnetic-resonance feature substance (NMR).

According to a preferred embodiment, the feature substance is a luminescence dye. According to a preferred embodiment, the luminescence dye is a fluorescent dye. According to a further preferred embodiment, the luminescence dye is a phosphorescence dye. According to a further preferred embodiment, the luminescence dye is a luminescence dye excitable in the UV region, which emits in the visible spectral region. According to a further preferred embodiment, it is a luminescence dye excitable in the visible spectral region, which emits in the visible spectral region. According to a further preferred embodiment, it is a luminescence dye emitting in the infrared region. The dyes can be purely organic molecules as well as metalorganic complexes.

According to a preferred embodiment, two or more fluorescent or phosphorescent luminescence dyes are mixed to create an energy transfer system or FRET system in which the first luminescence dye can after excitation emit its excitation energy partially or completely to the second luminescence dye. In case of a such FRET system, one of the involved luminescence dyes preferably is excitable in the UV region and emits in the visible spectral region, while the other luminescence dye is excitable in the visible spectral region and emits in the visible spectral region.

Examples of substance classes of UV-excitable luminescence dyes or those excitable in the visible spectral region, which emit in the visible spectral region, are purely organic luminescence dyes and luminescing metal complexes. Possible dyes classes are, for example, diarylpolyenes, diarylethenes, arylacetylenes, oxazoles, pyrazoles, benzazoles, anthrones, quinones, cyanines, rhodamines, oxazines, phenoxazines, thiazines, phenothiazines, perylenes, terylenes, coumarins, benzoxazinones or benzothiazinones, and rare earth metal complexes, e.g. β-diketonate-rare earth metal complexes or dipicolinate-rare earth metal complexes, here preferably neutral charged rare earth metal complexes. Other organic luminescence dye classes are likewise usable.

In particular, for luminescence dyes excitable in the visible spectral region which emit in the visible on account of their high light stability, preferably perylene dyes are used as a dye class.

Examples for suitable luminescence dye emitting in the infrared are organic fluorescent dyes or luminescing metal complexes like IR-1048, Cy7 or $Nd(TTA)_3$ (neodym-tris-thenoyltrifluoro acetone).

Examples of FRET systems are e.g. mixtures of a green-yellow excitable fluorescent dye and a green-yellow emitting fluorescent dye, for example a mixture with a weight ratio from 1:15 from 2,9-Bis(2,6-diisopropylphenyl)anthra [2,1,9-def 6,5,10-d'e'f']diisochinolin-1,3,8,10(2H,9H)-tetraon ($C_{48}H_{42}N_2O_4$, a green excitable perylene dye which has an orange luminescence emission, hereinafter referred to as "F-orange") and N-(2-(4-oxo-4H-benzo[d][1,3]oxazin-2-yl)phenyl)naphthale-2-sulfonamide ($C_{24}H_{16}N_2O_4S$, a UV-excitable luminescent dye which has a green luminescence emission, hereinafter called "F-green").

A FRET system can also serve to read out a forensic component in a luminescent pigment. Thus the acceptor dye can be excited not only by an energy transfer of the donor dye, but also a direct excitation of the acceptor dye can lead to luminescence thereof. For example, a mixture of F-orange and F-green can, on the one hand, be excited in the UV-A region, e.g. at 365 nm (excitation of the F-green followed by energy transfer to F-orange). On the other hand, the F-orange can be excited for a forensic test also directly, for example, by light of the wavelength 525 nm. The direct excitation of the acceptor substance can therefore be employed to distinguish FRET systems from other dye systems, and offers an additional security level which can be evaluated, e.g. in a laboratory or automatically by sensors.

According to a preferred embodiment, the luminescent pigment contains hence an energy transfer system (FRET system), preferably a FRET system from a UV-excitable luminescence dye as a donor and a luminescence dye excitable in the visible region as an acceptor. Preferably the acceptor is a perylene dye. Preferably the acceptor is employed as a forensic marker.

As luminescing feature substances, organic or metalorganic molecules are primarily suited, but quantum dots and inorganic pigments can also be protected by this method.

According to a preferred embodiment, the feature substance is an inorganic luminescent substance.

According to a preferred embodiment, the feature substance is an absorber dye for invisible radiation, e.g. an infrared absorber or UV absorber.

As absorbing feature substances, organic or metalorganic molecules are primarily suited, but quantum dots and inorganic pigments can also be protected via this method.

According to a preferred embodiment, the feature substance is an inorganic absorber substance.

Preferably the feature substance is an infrared absorber. Particularly preferably, the infrared absorber has no or only a low absorption in the visible spectral region. According to a preferred embodiment, the absorbers are narrow-band (e.g. with an FWHM (full width at half maximum) of less than 200 nm) or sharp-band (e.g. with a FWHM of less than 30 nm) and thus absorb in a narrow spectral region. According to a further preferred embodiment, the absorbers absorb on a broad band (e.g. with a FWHM of more than 200 nm). According to a preferred embodiment, the absorption maximum of the infrared absorber lies in the region of 700 nm to 900 nm, preferably in a region of 700 nm to 800 nm, and is thus suitable to be read out over standard infrared sensors for bank notes. According to a further preferred embodiment, the absorption maximum of the infrared absorber lies above 900 nm, further preferably above 950 nm, in particular preferably in the region of 1000 nm to 1100 nm, and is therefore not captured by standard infrared sensors for bank notes, can, however, be captured by special infrared sensors for bank notes.

According to a preferred embodiment, the absorption maximum or a strong absorption band of the UV absorber lies in the UV-A region from 315 nm to 380 nm, in particular preferably in the region from 350 nm to 380 nm. According to a further preferred embodiment, the absorption maximum or a strong absorption band of the UV absorber lies in the UV-B/C region from 200 nm to 315 nm, further preferably from 220 nm to 290 nm, in particular preferably from 240 nm to 270 nm.

Suitable infrared absorbers are commercially obtainable, for example from the company Fujifilm Imaging Dyes (e.g. CKK-55), the company BASF (e.g. Lumogen IR absorber) or the company Epolin under the trade name Epolight. For example, Epolight 4101 absorbs narrow-band at 739 nm and shows no noticeable inherent color upon thinned incorporation in a polymer. Likewise, for example, Epolight 4831 absorbs narrow-band at 1000 nm and shows no noticeable inherent color upon thinned incorporation in a polymer.

Suitable UV absorbers are obtainable, for example, at the company BASF under the trade names Tinuvin and Chimassorb. For example, Tinuvin 326 possesses a strong absorption band at 360 nm and Chimassorb 81 a strong absorption band at 330 nm.

According to a preferred embodiment, the feature substance is a switchable dye. Preferably it is a thermochromic or photochromic dye. According to a preferred embodiment, the switchable dye is a photochromic compound. Preferably it is a photochromic compound which is switchable between a first visible state and a second visible or invisible state. Preferably, the switching operation is carried out in one direction through irradiation with UV light, while the back-switching is effected either on its own (thermally) or by irradiation with visible light.

According to a preferred embodiment, the photochromic dyes are likewise luminescence dyes. Here, both or only one of the circuit states of the dye can be able to luminesce. The different switching states can possess identical luminescence properties (e.g. emission possess at the identical wavelength) or different luminescence properties (e.g. change of the emission wavelength after switching operation).

According to a preferred embodiment, the absorption band generated by the switching operation or emission band, in particular the generated absorption band, is located in the visible spectral region.

According to a further preferred embodiment, the absorption band generated by the switching operation or emission band is located in the infrared region, e.g. in a region from 700 nm to 900 nm.

Examples of suitable thermochromic dyes are, for example (a) organic molecules which upon a change of the temperature change their color by structural change, such as 9,9'-bixanthylides and 10,10'-bianthronylides; (b) combinations of a leuco dyes (e.g. spirolactones, spiropyrans) and a reversible proton donor (e.g. bisphenol A, 1,2,3-triazoles) and a phase-change material (e.g. paraffin) which upon change of the temperature change the color by protonation/deprotonation of the leuco dye; (c) dyes or metal complexes which change their color intensity temperature-dependently, e.g. temperature quenching with europium complexes; and (d) combinations of several dyes with different temperature behavior (e.g. a mixture of terbium and europium complexes, as it is described, among other things, in the print EP 0256922 B1 which can luminesce temperature-dependently red or green).

In this connection (a) and (d) are preferred on account of the clear color change and (b) less preferred on account of the complexity and difficult conversion.

Examples of suitable photochromic dyes are, for example, spiropyrans, stilbenes/azastilbenes, triarylmethanes, nitrones, fulgides, naphthopyrans, spirooxazines, quinones and diarylethenes. Diarylethenes are preferred on account of their high light stability. For example, the diarylethene BTF6 (=1,2- to (2-methyl-1-benzothiophene-3-yl) perfluorocyclopentene) in the open ring structure absorbs in the UV region at 200 nm to 300 nm and possesses no noticeable absorption bands in the visible spectral region, and is thus colorless. After irradiation with UV light of the wavelength 254 nm, however, it changes into the closed ring structure which has an absorption band in the visible spectral region at 530 nm and is thus colored. Upon excitation with UV light of the wavelength 315 nm, the closed as well as the open ring structure emit at 450 nm, it thus is at the same time a luminescence dye.

By waiting (thermal) or irradiation with visible light, e.g. light of the wavelength 400 nm, the closed ring structure can again be returned to the open ring structure.

Furthermore, it is possible to generate more complex encodings by targeted combination (or joint encapsulation) of different feature substances and to generate feature particle which are suitable for different machine-readable evidence methods at the same time.

In addition to the feature substance, further additives can be added to the core material or shell material, preferably the core material.

According to a preferred embodiment, UV absorbers are added to the core material. As a result of this, e.g. light resistance of the feature substance can be improved.

Suitable UV absorbers are obtainable, for example, from the company BASF under the trade name Tinuvin and Chimassorb, for example Chimassorb 81.

According to a further preferred embodiment, dyes are added to the core material. As a result of this, e.g. the inherent color of the pigments can be adapted (e.g. red or blue). Likewise dyes can be employed to modulate excitation or emission spectra of the feature substances.

Furthermore, it is attained with the core-shell construction that the chemical stability of the security pigments is independent of the chemical stability of the chosen feature substances. If one executes a qualitative stability test of printed patterns, a classification for visible effects such as e.g. luminescent pigments is often carried out in the following stages:
4: no visible change
3: slight change
2: significant change, less than 50% damaged
1: strong change, more than 50% damaged
0: element destroyed Qualitatively, the rating of the stability is effected with the help of the above-mentioned stages 0-4 in the case of luminescing feature substances absorbing in the VIS through viewing of the (excited) proof with the eye.

Quantitatively, the rating is effected through machine measurement, e.g. in case of luminescence-based feature substances by measuring the emission spectrum with the help of a fluorescence spectrometer, or in case of absorption-based feature substances by measuring the absorption spectrum with the help of a UV/VIS/NIR spectrometer.

According to experience, luminescing proofs having the stage 4 ("no visible change") possess a residual luminescence intensity of more than 80% based on the original luminescence intensity after the test. Analogously, a remaining signal intensity is likewise regarded for other feature substances by emission or absorption of more than 80% based on the original signal intensity as equivalent to "stage 4". This is designated hereinafter also a stability of more than 80%.

To be able to assess the stability of the security pigments qualitatively and quantitatively, an application-related test method is described hereinafter.

Test method A5 or A30:
incorporating the security pigments into an offset lacquer with a pigmentation of 15 percent by weight with a three-roll mill
proofing of the thus obtained printing ink in offset printing with a proof weight of 2 g/m$^2$ on bond paper ("banknote paper")
drying the proof at 60° C. for 12 h
immersing the proof (or a cut-off part of the proof) in the respective test substance against which the stability of the proof should be established for a time period of 5 minutes (A5) or 30 minutes (A30)
removing the proof from the test substance and washing off of adherent test substance with water
drying the proof at 60° C. for 2 h
The quantitative stability of the proof against the test substance results from the comparison of the signal intensity of the proof before and after treatment with the test substance (or the comparison of an untreated part of the proof with a treated part of the identical proof); stability=(intensity after treatment with solvent)/(intensity before treatment with solvent)

The security pigments on the basis of core-shell particle of the present invention here attain for application-relevant solvents, acids and bases the highest stage 4 or a stability >80% in proofs, even if proofs of the identical unprotected feature substance attain only the lowest stage 0.

According to a preferred embodiment, the highest stability stage "no visible change" or a stability >80%, preferably >90%, is present in the following application-relevant solvent tests according to test method A5, particularly preferably according to test method A30:

Determination of the stability against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine). Here, the action duration amounts to 5 or preferably 30 minutes to ensure that a sufficiently long contact takes place between security pigment and test substance.

According to a further preferred embodiment, the stated stability is likewise met for the following application-relevant solvents:
Ethanol
Trichloroethylene
Tetrachloroethylene
Xylene
Light gasoline
Sodium sulfite solution (10 percent by weight)
Sulfuric acid (2 percent by weight)
Ammonia solution (10 percent by weight)

According to a preferred embodiment, the security pigments are stable even against particularly aggressive chemical solvents for at least 5 minutes, e.g. acetone. In particular, acetone is able to attack most organic feature substances of the prior art.

Generally it is to be noted that the printing lacquer employed for the test or the substrate onto which there is printed must be stable even in the test, this is normally met by lacquers and substrates employed in the security print of value documents. The stability of the printing lacquer/substrate can, for example, be checked with inert luminescent substances (e.g. inorganic phosphors) or inert absorber substances (e.g. inorganic color pigments).

The security pigments are preferably employed for the manufacture of value documents. This happens preferably in the form of a printing ink, in particular for offset printing, screen printing or steel intaglio printing. Instead of incorporating the pigments directly in the printing lacquer or the printing ink, a pigment concentrate can also first be manufactured from the pigments. This has, e.g. a pigment content of 50% and can later be incorporated in the printing lacquer or the printing ink. This has application-technical advantages such as a faster initial training or avoiding of dust upon the initial training.

Alternatively, the security pigments can also be incorporated in a polymer composition, preferably to generate a master batch, or to manufacture a value-document substrate, a security foil, a mottling fiber or a security thread. This can be effected, for example, through extrusion.

The invention will hereinafter be described more closely on the basis of embodiment examples.

Example 1: Green Luminescent Pigment

In a laboratory kneader, the components
82.57 g of isophorone diisocyanate
28.14 g benzamide
25.71 g N-(2-(4-oxo-4H-benzo[d][1,3]oxazine-2-yl)phenyl) naphthalene-2-sulfonamide ($C_{24}H_{16}N_2O_4S$)
are kneaded at 140° C. for 30 min. Thereupon, 23.10 g of melamine are added and the mixture is kneaded up to the solidification. The obtained powder is ground to a grain size (d99) of 10 μm using an agitator ball mill with zirconium oxide grinding spheres approx. 1 mm in size. 100 g of this powder are added to 1.3 l of water and dispersed using a homogenizer. 900 ml of a 20% aqueous solution from hexahydroxymethylmelamine are added to this mixture and are offset with 8 ml of concentrated acetic acid. The obtained reaction mixture is heated for 2 h at 70° C. The obtained coated pigment is centrifuged and washed with 3 l of water. After a last centrifugation step, the pigment is dried in a drying oven at 60° C.

Approx. 175 g of pigment are obtained which upon irradiation with UV light of the wavelength 365 nm fluoresces green.

The obtained pigment is incorporated with a concentration of 15% into an offset lacquer (Sicpa Holding SA) using a three-roll mill and is printed in the offset printing with a proof weight of 2 g/m².

In the proof, the pigment shows a high stability against organic solvents as well as aqueous acids and bases (reaching the stage 4 "no visible change"), while proofs of the pure dye are not durable.

The quantitative determination of the stability against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine) according to test method A30 as well as acetone according to test method A5 delivers respectively a stability of more than 95%.

Example 2: Blue Luminescent Pigment

In a laboratory kneader, the components
82.57 g of isophorone diisocyanate
40.02 g of p-toluenesulfone amide
8.57 g 4,4'-bis(benzoxale 2 yl)stilbene ($C_{28}H_{18}N_2O_2$)
are kneaded at 140° C. for 30 min. Thereupon, 23.10 g of melamine are added and the mixture is kneaded up to the solidification. The obtained powder is ground to a grain size (d99) of 10 μm using an agitator ball mill with zirconium oxide grinding spheres approx. 1 mm in size. 100 g of this powder are added to 1.3 l of water and dispersed using a homogenizer. 900 ml of a 20% aqueous solution from hexahydroxymethylmelamine are added to this mixture and are offset with 8 ml of concentrated acetic acid. The obtained reaction mixture is heated for 2 h at 70° C. The obtained coated pigment is centrifuged and washed with 3 l of water. After a last centrifugation step, the pigment is dried in a drying oven at 60° C.

Approx. 160 g of pigment are obtained which upon irradiation with UV light of the wavelength 365 nm fluoresces blue.

The obtained pigment is incorporated with a concentration of 15% into an offset lacquer (hubergroup Deutschland GmbH) using a three-roll mill and is printed in the offset printing with a proof weight of 2 g/m².

In the proof, the pigment shows a high stability against organic solvents as well as aqueous acids and bases (reaching the stage 4 "no visible change"), while proofs of the pure dye are not durable.

The quantitative determination of the stability against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine) according to test method A30 as well as acetone according to test method A5 delivers respectively a stability of more than 95%.

Example 3: Green Luminescent Pigment (Comparative Example)

In a laboratory kneader, the components
82.57 g of isophorone diisocyanate
28.14 g benzamide
25.71 g N-(2-(4-oxo-4H-benzo[d][1,3]oxazine-2-yl)phenyl) naphthalene-2-sulfonamide ($C_{24}H_{16}N_2O_4S$)
are kneaded at 140° C. for 30 min. Thereupon, 23.10 g of melamine are added and the mixture is kneaded up to the solidification. The obtained powder is ground to a grain size (d99) of 10 μm using an agitator ball mill with zirconium oxide grinding spheres approx. 1 mm in size.

The obtained pigments from example 1 and example 3 (analogously constructed comparative example without protective shell) are incorporated with a three-roll mill with respectively 15 percent by weight into an offset lacquer (Sicpa Holding SA) and one proof each is created at 2 g/m² of proof thickness.

The proofs are inserted into acetone for 5 minutes and the fluorescence intensity is rated at 365 nm of excitation light before and after treatment with the solvent. For this purpose, the fluorescence of the proof is surveyed under a defined measurement geometry in a fluorescence spectrometer (Perkin-Elmer LS50B).

|  | Intensity before acetone | Intensity after acetone (5 minutes) |
|---|---|---|
| Example 1 | 100% | 99% |
| Example 3 | 100% | 5% |

Furthermore, the solvent stability is carried out according to test method A30 against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine). Ii delivers continuous intensities above 95% for the security pigment from example 1. The security pigment from comparative example 3, however, in spite of embedding in a strongly cross-linked duromer matrix as corresponds with the current prior art for security pigments, still shows e.g. a certain susceptibility compared with polar solvents and aqueous bases, because it possesses no protective additional MF encasing.

|  | Intensity before ethyl acetate | Intensity after ethyl acetate (30 minutes) |
|---|---|---|
| Example 1 | 100% | 100% |
| Example 3 | 100% | 9% |

|  | Intensity before NaOH | Intensity after NaOH 2% (30 minutes) |
|---|---|---|
| Example 1 | 100% | 99% |
| Example 3 | 100% | 70% |

Example 4: UV-Absorption Pigment with Blue Inherent Color

In a laboratory kneader, the components
79.63 g of the isocyanurate trimer of isophorone diisocyanate
31.72 g of p-toluenesulfone amide
2.00 g of urea
23 g Oil Blue 35 (1,4-bis-(butylamino)-anthraquinone)
10 g 2-Hydroxy-4-(octyloxy)benzophenone ($CH_3(CH_2)_7OC_6H_3(OH)COC_6H_5$)
are kneaded at 160° C. for about 30 min. Thereupon 14.12 g of melamine are added and the mixture is kneaded up to the solidification. Using an air jet mill, the obtained powder will be ground to a grain size (d99) of 3 μm. 50 g of this powder are added to 0.65 l of water and dispersed using a homogenizer. 450 ml of a 20% aqueous solution from hexahydroxymethylmelamine are added to this mixture and are offset with 4 ml of concentrated acetic acid. The obtained reaction mixture is heated for 2 h at 70° C. The coated pigment obtained is centrifuged and washed with 2 l of water. After a last centrifugation step, the pigment is dried in a drying oven at 60° C.

Approx. 80 g of a blue pigment are obtained which possesses in addition an absorption band in the region 280-350 nm.

The obtained pigment is incorporated with a concentration of 15% into a water-based screen printing ink (Pröll KG) with a three-roll mill and is printed in screen printing with a proof weight of 6 g/m².

In the proof, the pigment shows a high stability against organic solvents as well as aqueous acids and bases (reaching the stage 4 "no visible change"), while proofs of the pure dye are not durable.

The quantitative determination of the stability against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine) according to test method A30 as well as acetone according to test method A5 delivers respectively a stability of more than 95% (for the UV absorption as well as the blue inherent color).

Example 5: Infrared Absorption Pigment

In a laboratory kneader, the components
79.63 g of the isocyanurate trimer of isophorone diisocyanate
22.2 g Benzamide
2.00 g of urea
23 g of IR absorber CKK-55 (Fujifilm Imaging Colorants)
are kneaded at 160° C. for about 30 min. Thereupon 14.12 g of melamine are added and the mixture is kneaded up to the solidification. Using an air jet mill, the obtained powder will be ground to a grain size (d99) of 3 μm.

50 g of this powder are added to 0.65 l of water and dispersed using a homogenizer. 450 ml of a 20% aqueous solution from hexahydroxymethylmelamine are added to this mixture and are offset with 4 ml of concentrated acetic acid. The obtained reaction mixture is heated for 2 h at 70° C. The coated pigment obtained is centrifuged and washed with 2 l of water. After a last centrifugation step, the pigment is dried in a drying oven at 60° C.

Approx. 80 g of an infrared absorber pigment are obtained, which has an absorption band at 850 nm.

The obtained pigment is incorporated with a concentration of 15% into an offset lacquer (hubergroup Deutschland GmbH) using a three-roll mill and is printed in the offset printing with a proof weight of 2 g/m².

In the proof, the pigment shows a high stability against organic solvents as well as aqueous acids and bases (changing the absorption band intensity at 850 nm of less than 5%), while proofs of the pure absorber are not durable.

The quantitative determination of the stability against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine) according to test method A30 as well as acetone according to test method A5 delivers respectively a stability of more than 95%.

Example 6: Photochromic Pigment

In a laboratory kneader, the components
80.41 g of isophorone diisocyanate
27.11 g Benzamide
23.12 g Cis-1,2-dicyano-1,2-bis(2,4,5-trimethyl-3-thienyl) ethen ($C_{18}H_{18}N_2S_2$)
are kneaded at 140° C. for 30 min. Thereupon, 23.10 g of melamine are added and the mixture is kneaded up to the solidification. The obtained powder is ground to a grain size (d99) of 10 µm using an agitator ball mill with zirconium oxide grinding spheres approx. 1 mm in size.

100 g of this powder are added to 1.3 l of water and dispersed using a homogenizer. 900 ml of a 20% aqueous solution from hexahydroxymethylmelamine are added to this mixture and are offset with 8 ml of concentrated acetic acid. The obtained reaction mixture is heated for 2 h at 70° C. The obtained coated pigment is centrifuged and washed with 3 l of water. After a last centrifugation step, the pigment is dried in a drying oven at 60° C.

Approx. 175 g of pigment are obtained which upon irradiation with UV light of the wavelength 330 nm changes its color to red (returning to color is effected thermally or by irradiation with visible light, e.g. of the wavelength 520 nm).

The obtained pigment is incorporated with a concentration of 15% into an offset lacquer (Sicpa Holding SA) using a three-roll mill and is printed in the offset printing with a proof weight of 2 g/m².

In the proof, the pigment shows a high stability against organic solvents as well as aqueous acids and bases (reaching the stage 4 "no visible change"), while proofs of the pure dye are not durable.

The quantitative determination of the stability against polar organic solvents (test substance ethyl acetate), unpolar organic solvents (test substance toluene), aqueous acids (test substance HCl, 5 percent by weight), aqueous bases (test substance NaOH, 2 percent by weight), as well as aqueous redox-active solutions (test substance sodium hypochlorite solution, 5% of active chlorine) according to test method A30 as well as acetone according to test method A5 delivers respectively a stability of more than 95%.

The invention claimed is:

1. A security pigment, comprising core-shell particles having a core based on an organic addition polymer, a shell based on an organic condensation polymer and a feature substance present in the core in finely dispersed or dissolved form, wherein the addition polymer is a three-dimensionally cross-linked duromer.

2. The security pigment according to claim 1, wherein the addition polymer is formed from trimeric isocyanate monomers, and amines or alcohols.

3. The security pigment according to claim 2, wherein the amines are selected from mono-, di- and triamines.

4. The security pigment according to claim 1, wherein the feature substance is a fluorescent or phosphorescent or photochromic or thermochromic feature substance or a UV- or IR- or VIS-absorbing dye.

5. The security pigment according to claim 1, wherein the feature substance is an organic or a metalorganic substance.

6. The security pigment according to claim 1, wherein the fluorescent or phosphorescent feature substance is excitable in the UV spectral region, with a wavelength of 365 nm and emits in the visible spectral region.

7. The security pigment according to claim 1, wherein the fluorescent or phosphorescent feature substance emits in the IR spectral region, between 700 nm and 2500 nm.

8. The security pigment according to claim 1, wherein in the core two different luminescing dyes are present in finely dispersed or dissolved form, which form an energy transfer system in which the first luminescing dye after exciting transfers its excitation energy partially or completely to the second luminescing dye.

9. The security pigment according to claim 1, wherein the condensation polymer of the shell and the addition polymer of the core contain at least one identical monomer as a polymer constituent.

10. The security pigment according to claim 1, wherein the condensation polymer of the shell contains melamine as a monomer and contains at the same time the addition polymer of the core melamine as a monomer.

11. The security pigment according to claim 1, wherein the condensation polymer of the shell is a formaldehyde-based condensation polymer, including a melamine-formaldehyde resin, melamine-phenol-formaldehyde resin or a phenol-formaldehyde resin or a melamine-guanidine-formaldehyde resin or a phenol-resorcin-formaldehyde resin.

12. The security pigment according to claim 1, wherein the security pigment is stable according to the test method A5, against toluene, ethyl acetate, hydrochloric acid (5%), sodium hydroxide solution (2%) and sodium hypochlorite solution (5% of active chlorine), wherein the feature intensity remaining after the test is higher than 80% of the start intensity.

13. The security pigment according to claim 1, wherein the security pigment is stable according to the test method A5 against acetone, wherein the feature intensity remaining after the test is higher than 80% of the start intensity.

14. The security pigment according to claim 1, wherein the mass fraction of the shell amounts to more than 10% in relation to the mass of the core.

15. Method for manufacturing a security pigment according to claim 1, having
a) the step of supplying a particle based on an addition polymer with a feature substance dissolved therein or present finely dispersed therein; and
b) the step of encasing the particle obtained in step a) with a shell based on a condensation polymer,
wherein the addition polymer is a three-dimensionally cross-linked duromer.

16. The method according to claim 15, wherein the particles based on an addition polymer by a mixture of a trimeric isocyanate monomer, the isocyanurate trimer of isophorone diisocyanate and different mono-, di- or triamines using a mixed tool, an industrial kneader or a twin-screw extruder, are heated to 150° C. to 250° C., and are thereupon ground to a grain size (D99) of smaller than 25 µm.

17. The method according to claim 15, wherein in step b) the
- particles obtained in step a) in a concentration in a region of 1 g/l to 250 g/l, and
- a condensation prepolymer, a melamine formaldehyde prepolymer in a 0.1-fold to 10-fold quantity of the mass of the particles obtained in step a)
- are stirred and thereby encased in a protective case using a homogenizer at temperatures in a region of 10° C.–100° C. at a pH value in a region from 1 to 6.5.

18. A pigment concentrate or printing ink, for offset printing, screen printing or steel intaglio printing, having a security pigment according to claim 1.

19. The polymer composition having a security pigment according to claim 1, wherein the polymer composition is present in the form of a value-document substrate, a security foil, a mottling fiber or a security thread.

20. The value document, mottling fiber, security thread or security foil having a security pigment according to claim 1.

* * * * *